United States Patent
Vogt et al.

(10) Patent No.: US 11,099,051 B2
(45) Date of Patent: Aug. 24, 2021

(54) METHOD AND FILL LEVEL MEASURING DEVICE FOR DETERMINING THE FILL LEVEL OF A MEDIUM BY MEANS OF CONTINUOUS WAVE RADAR MEASUREMENT

(71) Applicant: KROHNE S.A.S., Romans-sur-Isère (FR)

(72) Inventors: Michael Vogt, Bochum (DE); Robert Storch, Lüdenscheid (DE); Gordon Notzon, Bochum (DE)

(73) Assignee: KROHNE S.A.S., Romans-sur-Isère ( * ) Notice: Subject to any disclaimer, the term of this patent is extended or adjusted under 35 U.S.C. 154(b) by 266 days.

(21) Appl. No.: 16/152,958

(22) Filed: Oct. 5, 2018

(65) Prior Publication Data
US 2019/0107428 A1 Apr. 11, 2019

(30) Foreign Application Priority Data
Oct. 5, 2017 (DE) .......................... 102017123185.4

(51) Int. Cl.
*G01F 23/284* (2006.01)
*G01S 13/32* (2006.01)
(Continued)

(52) U.S. Cl.
CPC .............. *G01F 23/284* (2013.01); *G01S 7/03* (2013.01); *G01S 13/325* (2013.01); *G01S 13/53* (2013.01); *G01S 13/88* (2013.01)

(58) Field of Classification Search
CPC ........ G01F 23/284; G01S 7/03; G01S 13/325; G01S 13/53; G01S 13/88
See application file for complete search history.

(56) References Cited

U.S. PATENT DOCUMENTS

2012/0056774 A1 3/2012 Wennerberg et al.
2018/0252809 A1* 9/2018 Davis .................... G01S 13/931
(Continued)

FOREIGN PATENT DOCUMENTS

DE      69319804 T2    11/1998
DE   102010063733 A1    6/2011
(Continued)

OTHER PUBLICATIONS

European Search Report Application No. 18193845.7 Completed: Mar. 4, 2019 9 Pages.

*Primary Examiner* — Erin F Heard
*Assistant Examiner* — Donald H B Braswell
(74) *Attorney, Agent, or Firm* — Whitmyer IP Group, LLC

(57) ABSTRACT

A method for determining the fill level of a medium involves continuous wave radar measurement and a corresponding fill level measuring device. A coded transmit signal is emitted by a transmitter, reflected at the medium, and received by a receiver as a reflection signal. The reflection signal and a signal derived from the transmit signal are subjected to a correlation analysis, and a correlation outcome results. A control and evaluation unit determines the time offset of the correlated signals with the correlation outcome, and uses it to determine the fill level of the medium. The reflection signal and the derived signal are mixed with the analog mixer into a mixer output signal that is sampled and quantized to a digital mixer output signal. The correlator has a digital integrator with which a sequence of digital mixer output signals is digitally integrated into the correlation outcome.

12 Claims, 9 Drawing Sheets

(51) Int. Cl.
*G01S 13/88* (2006.01)
*G01S 7/03* (2006.01)
*G01S 13/53* (2006.01)

(56) References Cited

U.S. PATENT DOCUMENTS

2018/0328771 A1* 11/2018 Edvardsson .......... G01S 13/103
2019/0080612 A1* 3/2019 Weissman .............. G08G 1/164

FOREIGN PATENT DOCUMENTS

| | | |
|---|---|---|
| EP | 1124142 A1 | 8/2001 |
| EP | 1933117 A2 | 6/2008 |
| EP | 3029434 A1 | 6/2016 |
| GB | 2304249 A | 3/1997 |
| GB | 2317769 A | 4/1998 |

* cited by examiner

METHOD AND FILL LEVEL MEASURING DEVICE FOR DETERMINING THE FILL LEVEL OF A MEDIUM BY MEANS OF CONTINUOUS WAVE RADAR MEASUREMENT

TECHNICAL FIELD

The invention relates to a method for determining the fill level of a medium by means of continuous wave radar measurement, wherein a code sequence is generated by a code sequence generator and a coded transmit signal coded with the code sequence is emitted by a transmitter, wherein the transmit signal is at least partially reflected at the medium and is received by a receiver as a reflection signal, wherein the reflection signal and a derived signal being derived from the transmit signal are subjected to a correlation analysis with a correlator and a correlation outcome results, wherein a control and evaluation unit determines the time offset of the correlated signals with the correlation outcome and uses it to determine the fill level of the medium. Furthermore, the invention relates to a fill level measuring device for determining the fill level of a medium by means of continuous wave radar measurement, having a code sequence generator, a transmitter, a receiver, a correlator and a control and evaluation unit, which are employed and interact in such a manner that the above-mentioned method is implemented by the measuring device.

BACKGROUND

Fill level measuring devices based on radar measurement have been in industrial use for many years. A common feature of fill level measuring devices and the methods used in them is that they measure the time it takes for a transmit signal generated in the fill level measuring device to travel from a defined emission point to the surface of the medium and from there back to the defined location of the receiver as a reflection signal, wherein the receiver is not only understood to be the location of the physical reception of the reflection signal (e.g. receiving antenna), but also the location or local area of the evaluation of the reflection signal. In any case, the distance of the medium surface from the fill level measuring device can be inferred from the measured transit time and the knowledge of the propagation speed of the electromagnetic waves.

Fill level measuring devices are differentiated into wired and wireless types of instrumentation. In the case of wired devices, the electromagnetic waves propagate along a cable suspended in the volume to be measured, which is why such fill level measuring devices are comparatively interference-free. However, they have the disadvantage that the cable serving as a measuring probe must be situated in the path to be measured. With wireless fill level measuring devices, this problem does not arise because the electromagnetic waves are emitted into the space to be measured as a free-space wave via a transmitter designed as an antenna. Such fill level measuring devices are somewhat more susceptible to interference, for example due to the reception of parasitic echoes from housing walls or installations in the housing. In the case of the methods and the fill level measuring devices considered here, the method of wave guidance described above is irrelevant.

What is important for the method and the type of fill level measuring device under consideration is that the principle of continuous wave radar measurement is used, in which, in contrast to pulse radar, a transmit signal provided with a certain coding is continuously emitted during the duration of the measurement process; this is the reason it referred to as "continuous wave radar". By coding the transmit signal, a characteristic and thus recognizable pattern is applied to the transmit signal over its duration, so that every location in the transmitted signal can be recognized. In principle, the correlator of the fill level measuring device then compares the coded transmit signal and the reflection signal—which has the same coding—with one another, wherein the coding makes it possible to determine the time offset between the transmit signal and the reflection signal. Since the original transmission signal is no longer available when the reflection signal arrives, a derived signal being derived from the transmit signal is usually generated, wherein this derived signal has the same coding as the transmit signal so that a correlation analysis can be carried out meaningfully by the correlator. On the basis of the correlation outcome, the time offset of the correlated signals and the fill level of the medium can then be determined.

Two different methods for fill level determination using continuous wave level transmitters are essentially known from the prior art. In the first method, the entire signal processing is carried out in analog circuit technology, i.e. time continuous, without sampling and quantization, i.e. the correlator is also constructed in analog circuit technology. The reflection signal is mixed (multiplied) with the coded transmit signal or with a transmit signal derived from the coded transmit signal and fed to an analog integrator, either directly or via an analog low-pass filter. The integrator and the low-pass filter are then implemented, for example, with operational amplifiers or in other analog semiconductor circuit technology. The problem with this solution is that the integrator must also adhere to a known integration time in order to perform high-precision measurements, i.e. to calculate the correlation integral. This is difficult to guarantee, since these are analog circuit components that naturally have component tolerances, are subject to aging effects, and in some cases are quite temperature-dependent.

In another method, the entire signal processing in the receive chain is completely digital, i.e. time-discrete and also quantized in terms of value. For this, the reflection signal is sampled (directly or sequentially) and subsequently a digital correlation filter is implemented in digital signal processing. Although this method avoids some disadvantages of signal processing being completely implemented in analog technology, other disadvantages are accepted, such as a worse signal-to-noise ratio, a long measurement time due to the sequential sampling of the reflection signal, which must always be extended over the entire length of the code sequence, even if only the correlation over a smaller time interval is of interest. Furthermore, the effort required to implement a suitable sampling circuit for sampling the high-frequency reflection signal is considerable, since only RF components that cover the entire RF bandwidth can be used. Further digital signal processing, regardless of whether digital signal processors are used or if necessary solutions with FPGAs are used, is also technologically challenging and costly.

SUMMARY

The object of the present invention is to provide a method for determining the fill level of a medium by means of continuous wave radar measurement and a related fill level measuring device which largely avoids the disadvantages of the solutions known from the prior art.

The above derived object is achieved by the method described above for determining the fill level of a medium by means of continuous wave radar measurement and by the fill level measuring device shown at the beginning in that the correlator has an analog mixer and the reflection signal and the derived signal being derived from the transmit signal are mixed with the analog mixer into a mixer output signal, that the correlator has an analog/digital converter, with which the mixer output signal is sampled and quantized into a digital mixer output signal, and that the correlator has a digital integrator with which a sequence of digital mixer output signals is digitally integrated into the correlation outcome. In the proposed solution, in contrast to the prior art, the signal processing on the receiving side is not purely analog (i.e. time continuous and not clocked hardware) and is not purely constructed in digital technology like a discrete sampling system. Instead, a hybrid correlation receiver is implemented which makes use of analog circuit technology in the high-frequency range and which makes use of time discrete, digital solutions where technically less demanding time requirements exist. The mixer, with which the signals to be correlated are multiplied, is constructed using analog circuit technology, so that the reflection signal can be mixed with the derived signal being derived from the transmit signal continuously over time and at practically any speed. The subsequent analog/digital converter mediates between the time-continuous analog world and the time-discrete digital world, wherein a sampling frequency is selected which lies in the low-frequency spectral range of the mixer output signal. The sampling frequency is very small compared to the frequency of the transmit signal or the reflection signal. At the same time, the temporal integration can be carried out with high precision, since the integrator is constructed using digital technology and high-precision and highly stable oscillators exist for clocking and are available at low cost.

According to a preferred implementation of the method, it is provided that the correlator also has an analog low-pass filter and that the mixer output signal is filtered by the low-pass filter and the low-pass filtered mixer output signal is sampled by the analog/digital converter and quantized to a digital mixer output signal. The analog low-pass filter pre-filters the mixer output signal. The primary function of the analog low-pass filter is to spectrally limit the mixer output signal so that it can be sampled and quantized accurately with a comparatively low sampling frequency.

A binary code sequence of the length $N_{code}$ is preferably generated by the code sequence generator, wherein the transmitter emits each bit of the binary code sequence with the bit duration $T_{chip}$ and thus the transmitter emits the binary code sequence with the binary code sequence duration $T_{code}=N_{code}*T_{chip}$. The bit duration $T_{chip}$ is selected as small as possible in order to obtain a transmit signal and reflection signal with the highest possible frequency, as this has a direct effect on the spatial resolution. The bit duration for a single code segment is designated here with $T_{chip}$, whereby it is indicated that clocking is specified by hardware.

The sampling of the mixer output signal, in particular the low-pass filtered mixer output signal, is preferably carried out with a sampling frequency $f_{sample}$ of the analog/digital converter between the bit frequency $1/T_{chip}=f_{chip}$ and the code sequence frequency $f_{code}=1/T_{code}$. The greater the code length $N_{code}$ is selected, the lower the sampling frequency $f_{sample}$ can be selected later. Preferably, the sampling frequency $f_{sample}$ of the digital/analog converter is selected at least twice as large as the code sequence frequency $f_{code}$, preferably the sampling frequency $f_{sample}$ is selected as a multiple greater than ten times the code sequence frequency $f_{code}$. For large code lengths $N_{code}$, the sampling frequency $f_{sample}$ can be selected at powers of ten below the bit frequency $f_{chip}=1/T_{chip}$ (for example, at $N_{code}=100,000$, the sampling frequency of the analog/digital converter can be selected five powers of ten lower than the bit frequency). In any case, the low-pass filtering of the mixer output signal is helpful, because the low-pass filter then serves as an anti-aliasing filter for digitization with the subsequent analog/digital converter with the lowest possible sampling frequency, which makes it possible to use an analog/digital converter that is as inexpensive as possible.

The features described above apply equally to the claimed method for fill level measurement using the continuous wave method and to the claimed fill level measuring device.

BRIEF DESCRIPTION OF THE DRAWINGS

In detail, there are now various possibilities for designing and further developing the method according to the invention and the fill level measuring system. For this, reference is made to the patent claims subordinate to the independent patent claims and to the description of preferred embodiments in conjunction with the drawing.

DETAILED DESCRIPTION

FIGS. 1, 2 and 4 to 9 show a method 1 for determining the level of a medium 2 by means of continuous wave radar measurement and a corresponding fill level measuring device 3. The method steps result from the structural representations of the aforementioned figures from the signal flow (temporal sequence) and from the functional significance of the blocks used in the respective schematic block diagram representations.

Figure 1:
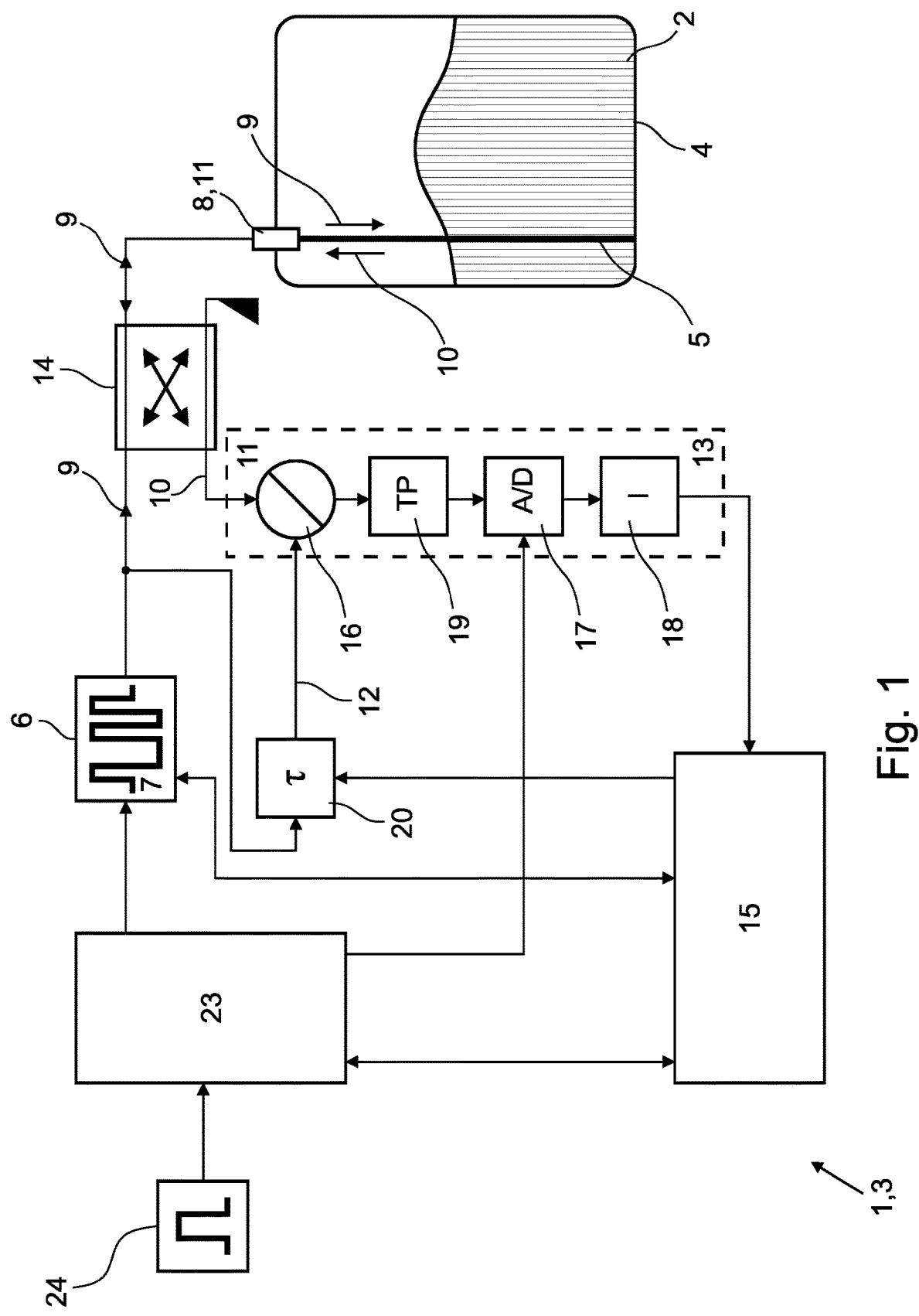
FIG. 1 illustrates a method and also a fill level measuring device for determining the fill level of a medium by means of continuous wave radar measurement, wherein a derived signal being derived from the transmit signal is generated with a delay element.

FIG. 1 first shows the basic structure of the fill level measuring device 3. A silo/tank is shown on the right side, which is partially filled with the medium 2, here a bulk material. In FIGS. 1, 2, 8 and 9, a cable 5 extends into the tank 4 for wave guidance, i.e. these are TDR solutions (time domain reflectometry). In the embodiments in FIGS. 5 to 7, the continuous wave radar beams propagate in the free space of the tank 4.

A code sequence 7 is generated by a code sequence generator 6 and a coded transmit signal 9 being coded with the code sequence 7 is emitted by a transmitter 8, wherein the transmit signal 9 is at least partially reflected by the medium 2 and is received by a receiver 11 as a reflection signal 10. The reflection signal 10 and a derived signal 12 being derived from the transmit signal 9 are subjected to a correlation analysis with a correlator 13, resulting in a correlation outcome. The correlation outcome indicates whether the two signals subjected to the correlation analysis, i.e. the reflection signal 10 and the derived signal 12 being derived from the transmit signal 9, are correlated. The correlator calculates a correlation integral that provides the value 1 in the standardized form if the correlated signals are completely identical and otherwise—depending on the degree of conformity—provides a value smaller than 1. The correlation analysis with the relevant correlation integrals in the continuous or discrete time domain is known per se.

In the embodiments shown, the transmit signal 9 and the received reflection signal 10 are fed back and forth via a single physical line on the process side, i.e. in the area of the connecting path to the tank 4. In order to separate the reflection signal 10 from the transmit signal 9, a directional coupler 14 is used in the embodiments, with which power components of the guided waves are transmitted to other cables depending on the direction of signal travel. In this case, the reflection signal 10 in the directional coupler 14 of the cable is fed to the receiver 11.

The receiver 11 is shown in the figures at several locations in some instances, which is explained by different parts of the fill level measuring device 3 actually having to do with receiving the reflection signal 10.

In any case, the correlation outcome of the correlator 13 is passed on to a control and evaluation unit 15, which uses the correlation outcome to determine the time offset of the correlated signals and, from this, the fill level of the medium.

It can be seen in the figures that the correlator 13 has an analog mixer 16, which works continuously over time, wherein the reflection signal 10 and the derived signal 12 being derived from the transmit signal are mixed with the analog mixer 16 into a mixer output signal. Here the mixing consists of a multiplication, in effect, the integrand of the correlation integral is formed.

The correlator 13 also has an analog/digital converter 17 which samples the mixer output signal and quantizes it to a digital mixer output signal.

Furthermore, the correlator 13 has a digital integrator 18 with which a sequence of digital mixer output signals is digitally integrated into the correlation outcome. The digital integrator 18 integrates the values of the integrand of the correlation integral calculated and output by the mixer 16 and digitized in an intermediate step. It is also crucial for the accuracy of the calculation of the correlation integral that the integration duration can be maintained very precisely, i.e. the time during which the digital integrator continuously integrates the provided values of the integrand. This can be guaranteed in digital technology much easier and with very high precision in contrast to integrators in analog technology.

In the figures, the elements that make up the correlator 13, i.e. analog mixer 16, analog/digital converter 17 and digital integrator 18, are surrounded by a dashed box that bears both the reference sign 11 for the receiver and the reference sign 13 for the correlator. Both designations are correct, the assemblies and functional units making up the correlator 13 actually form the largest functional part of the receiving path. The receiver 11 is therefore also referred to as the correlation receiver.

In the present case, it is essential that the receiving side of the fill level measuring devices 3 shown uses both time-continuous, analog circuit technology, namely in the form of the analog mixer 11, and also uses time-discrete and quantized digital technology. This ensures that a fast, analog technology that carries out signal processing quasi in the physical characteristics of the used components is used and, in a further field that is less time-critical, high-precision time-discrete electronics are used, which guarantees, for example, that the integration time for the calculation of the correlation integral can be adhered to with extreme precision, which is difficult, complex and expensive with analog technology. The correlator 13 and receiver 11 shown here could therefore also be described as a "hybrid correlation receiver".

All representations have in common that the correlator 13 has an analog low-pass filter 19, i.e. a low-pass filter 19 that works continuously over time and is implemented in hardware, wherein the mixer output signal is filtered by the low-pass filter 19 and the low-pass filtered mixer output signal is sampled by the analog/digital converter 17 and quantized to a digital, time-discrete mixer output signal. The mixer output signal is spectrally limited with the analog low-pass filter 19, so that it can be sampled and quantized accurately at a comparatively low, or even very low, sampling frequency.

Figure 2:
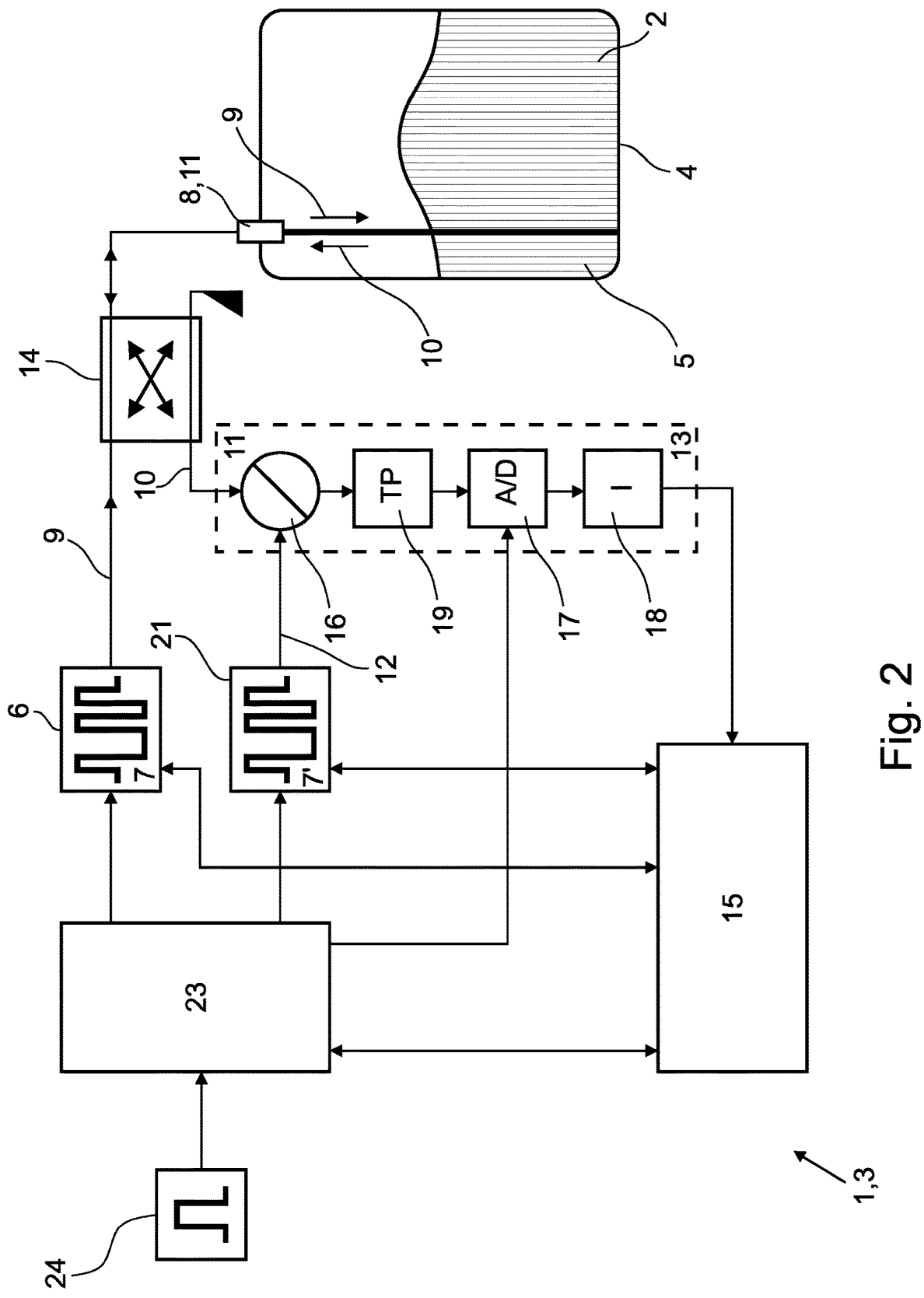
FIG. 2 illustrates a fill level measuring device and a method implemented therein for determining the fill level, wherein the derived signal being derived from the transmit signal is generated with a separate code sequence generator.

FIG. 1 shows that the derived signal 12 being derived from the transmit signal 9 is generated from the transmit signal 9 with a delay element 20, so that the derived signal has the same coding as the transmit signal 9, but is time-shifted. FIG. 2 shows an alternative procedure in which the derived signal 12 is generated with a further code sequence generator 21, wherein the further code sequence generator 21 generates the same code sequence 7' of the code sequence generator 6, but generates it time-shifted to the code sequence 7 of the code sequence generator 6. Setting different time delays between the reflection signal 10 and the derived signal 12 with the same coding is necessary in order to be able to perform correlation analysis for different time shifts of the signals. If an ideal or largest possible correlation value is calculated for a particular time shift, the particular time shift corresponds to the signal propagation time, which is a measure for the measured distance.

Figure 3A:
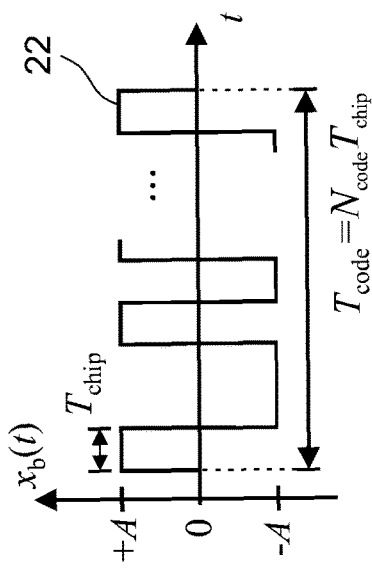
FIGS. 3A-3B illustrate schematic representations of the signals used and obtained according to the method in the time and frequency range.
Figure 3B:
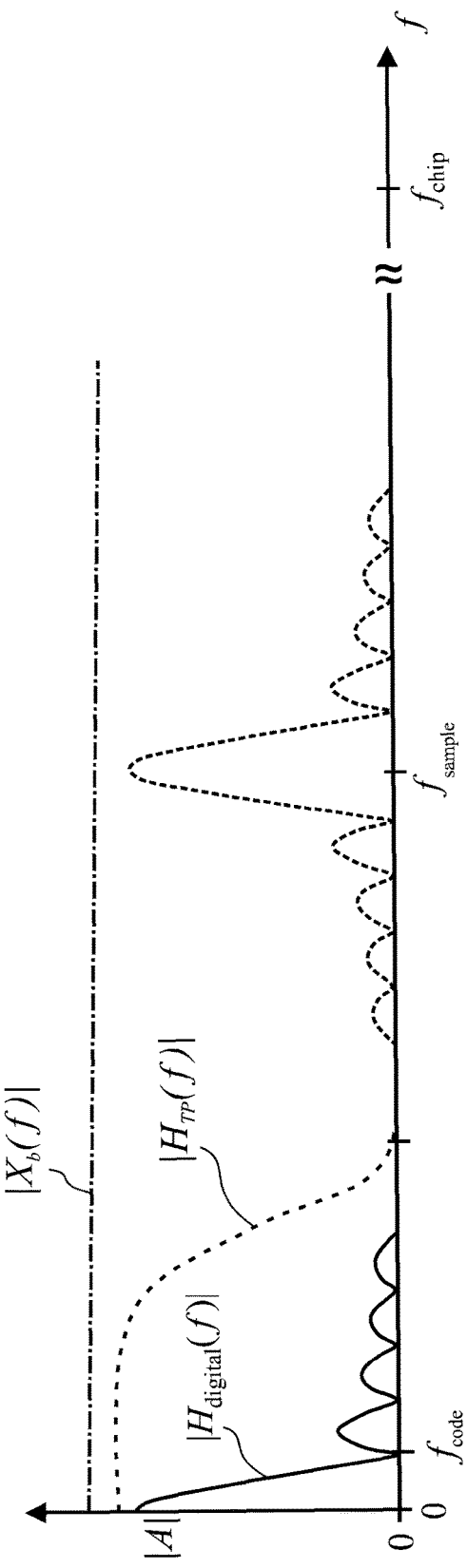

In FIGS. 3A-3B, the generated signals (FIG. 3A) in the time domain and the behavior of the receiving side in the frequency domain (FIG. 3B) are sketched as examples. FIG. 3A illustrates a binary code sequence 22, $x_b(t)$ of length $N_{code}$ generated by the code sequence generator 6. The transmitter 8 then emits each bit of the binary code sequence 22 with a bit duration $T_{chip}$. Thus the transmitter 8 emits the binary code sequence 22 with the binary code sequence duration $T_{code}=N_{code}*T_{chip}$. In FIG. 3B, it can be seen in the schematic amplitude diagram above the frequency axis that the bit frequency $f_{chip}=1/T_{chip}$ is the highest frequency event in the fill level measuring device. The absolute spectrum $abs(X_b(f))$ of the binary code sequence 22, $x_b(t)$ is extremely broadband. The transfer function of the digital filter over the sampling frequency $f_{sample}$ is shown as a solid line, the corresponding aliasing is shown as a dashed line. The sampling of the mixer output signal, here the low-pass filtered mixer output signal, is carried out with a sampling frequency $f_{sample}$ the analog/digital converter (17). Sampling takes place between of the bit frequency $1/T_{chip}$ and the code sequence frequency $f_{code}=1/T_{code}$, in particular where the sampling frequency $f_{sample}$ the analog/digital converter 17 of corresponds to at least twice the code sequence frequency $f_{code}$. An exemplary value for the bit frequency here is $f_{chip}=2$ GHz. If $N_{code}=100{,}000$ is set for the code sequence length, the code sequence frequency is only 20 kHz. Sampling can then be carried out easily with a frequency of, for example, $f_{sample}=100$ kHz. The analog low-pass filter 19 is set in such a way that it serves as an anti-aliasing filter for digitization with the subsequent analog/digital converter 17 with the lowest possible sampling frequency; the transfer function $abs(H_{TP}(f))$ of the low-pass filter is also shown as a dashed line, it suppresses all frequencies above about half the sampling frequency $f_{sample}$.

With regard to FIGS. 1 and 2, it has been stated that the derived signal 12 being derived from the transmit signal 9 has the same coding as the transmit signal 9, but is time-shifted. This also applies to the other examples shown in the other figures. In the embodiments shown, the time delay is implemented sequentially in the interval from the bit duration $T_{chip}$ up to a maximum of the binary code sequence duration $T_{code}=N_{code}*T_{chip}$, wherein the time delay in each case is increased by the bit duration $T_{chip}$ in increments. In this manner, the fill level information can be determined with the best local resolution. It is not absolutely necessary to let the time delay be implemented up to the binary code sequence duration $T_{code}$, it can even be advantageous to let the time delay end at a significantly smaller value $T_{code}$, namely at the value which corresponds to the existing maximum measuring range and thus the required uniqueness range. The echoes of the further transit times are then of no interest; accordingly, it is possible to save measuring time by limiting to a time shorter than $T_{code}$.

It can be seen from the explanations that the accuracy of the measurement depends decisively on how well the generation of the different signals is attuned to one another. For this reason, it is provided that the control and evaluation unit 15 at least indirectly synchronizes the generation of the code sequence 7 by the code sequence generator 6, the generation of the derived signal 12 being derived from the transmit signal 9, the sampling of the mixer output signal and the sampling of the low-pass filtered mixer output signal and preferably also the integration of the digital integrator 18, which is shown by the connections between the corresponding blocks in the figures. In the fill level measuring devices shown, the control is also carried out indirectly via a clock and synchronization controller 23, wherein the clock and synchronization controller 23 preferably has a digital, high-precision clock pulse 24. The control is implemented in such a manner that the control and evaluation unit 15 requests a new measurement centrally from the clock and synchronization controller 23, wherein the clock and synchronization controller 23 then triggers the corresponding processes at the connected points, e.g. at the code sequence generators 6, 21 and at the analog/digital converter 17.

Figure 4:
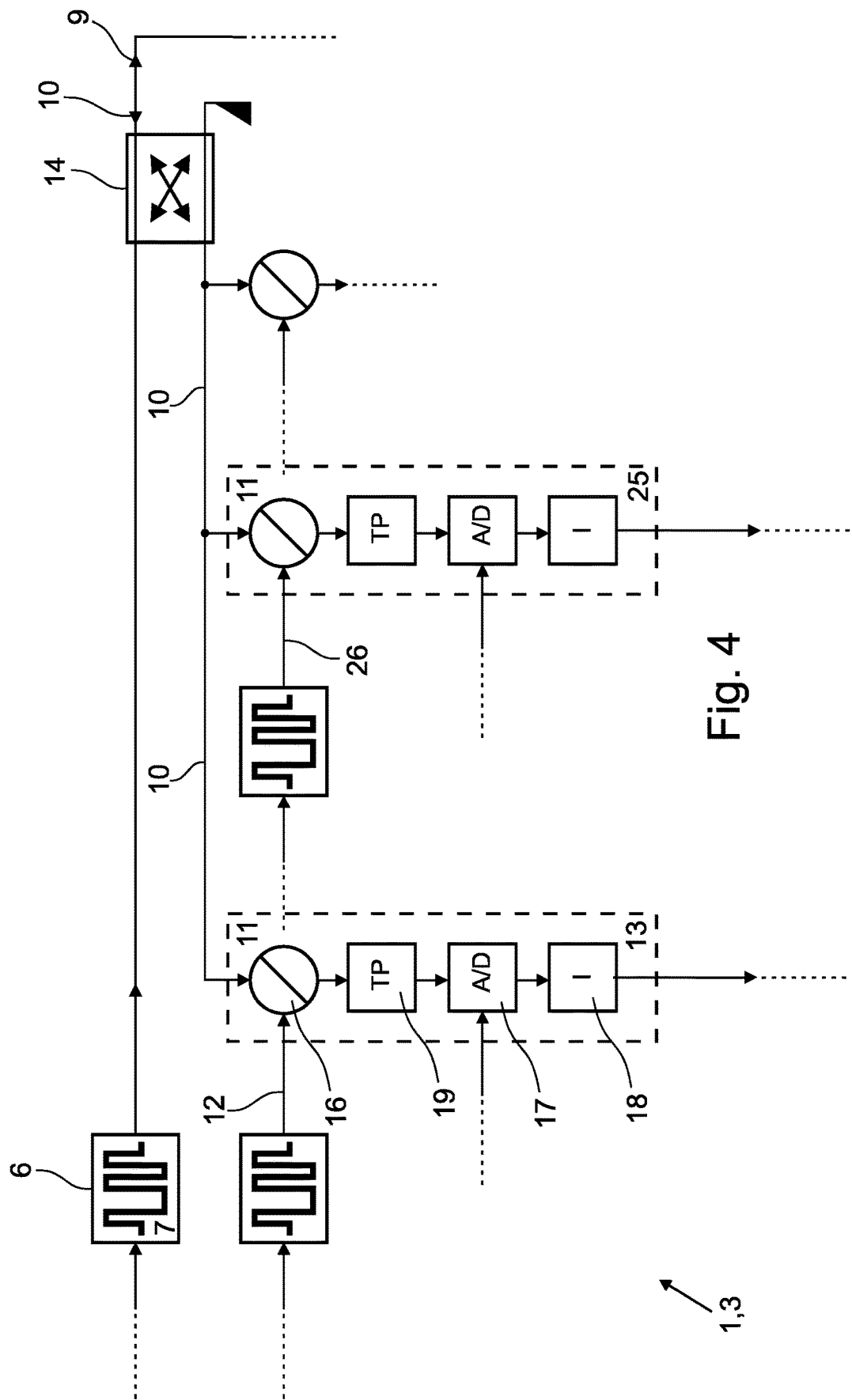
FIG. 4 illustrates a fill level measuring device with two parallel correlation receivers.

The fill level measuring device 3 shown in FIG. 4 or the method 1 shown in FIG. 4 for operating the fill level measuring device 3 is characterized in that by means of at least one further correlator 25, the reflection signal 10 and a further derived signal 26 being derived from the transmit signal 9 are subjected to a correlation analysis with the further correlator 25, wherein the further derived signal 26 is time-shifted with respect to the transmit signal 9 and with respect to the derived signal 12 being derived from the transmit signal 9, so that at least two parallel correlation receivers are implemented. In this manner, a correlator bank is implemented with which parallel measuring signal processing takes place. In order to maintain clarity, corresponding function blocks to be supplemented have been omitted in the illustration. Of course, the correlation outcomes of both correlators 13, 25 are transmitted to the control and evaluation unit 15.

Figure 5:
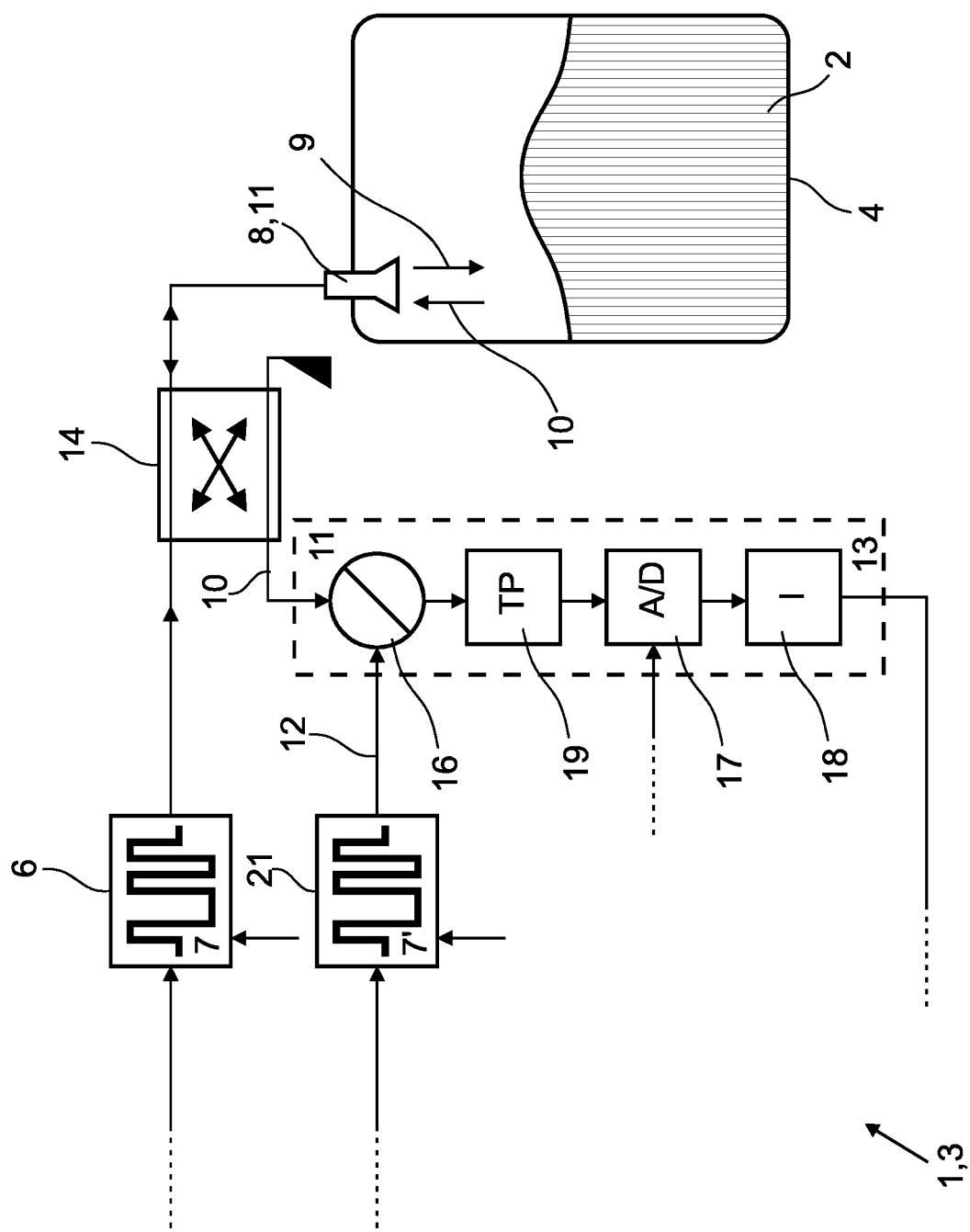
FIG. 5 illustrates a fill level measuring device and a method implemented therein for the implementation of free-radiating fill level measurement.

FIG. 5 shows a fill level measuring device 3 and a related method 1 for fill level determination, which differs from the embodiment shown in FIG. 2 only in that the fill level measurement does not work with a cable-guided radar, but with freely radiating radar.

Figure 6:
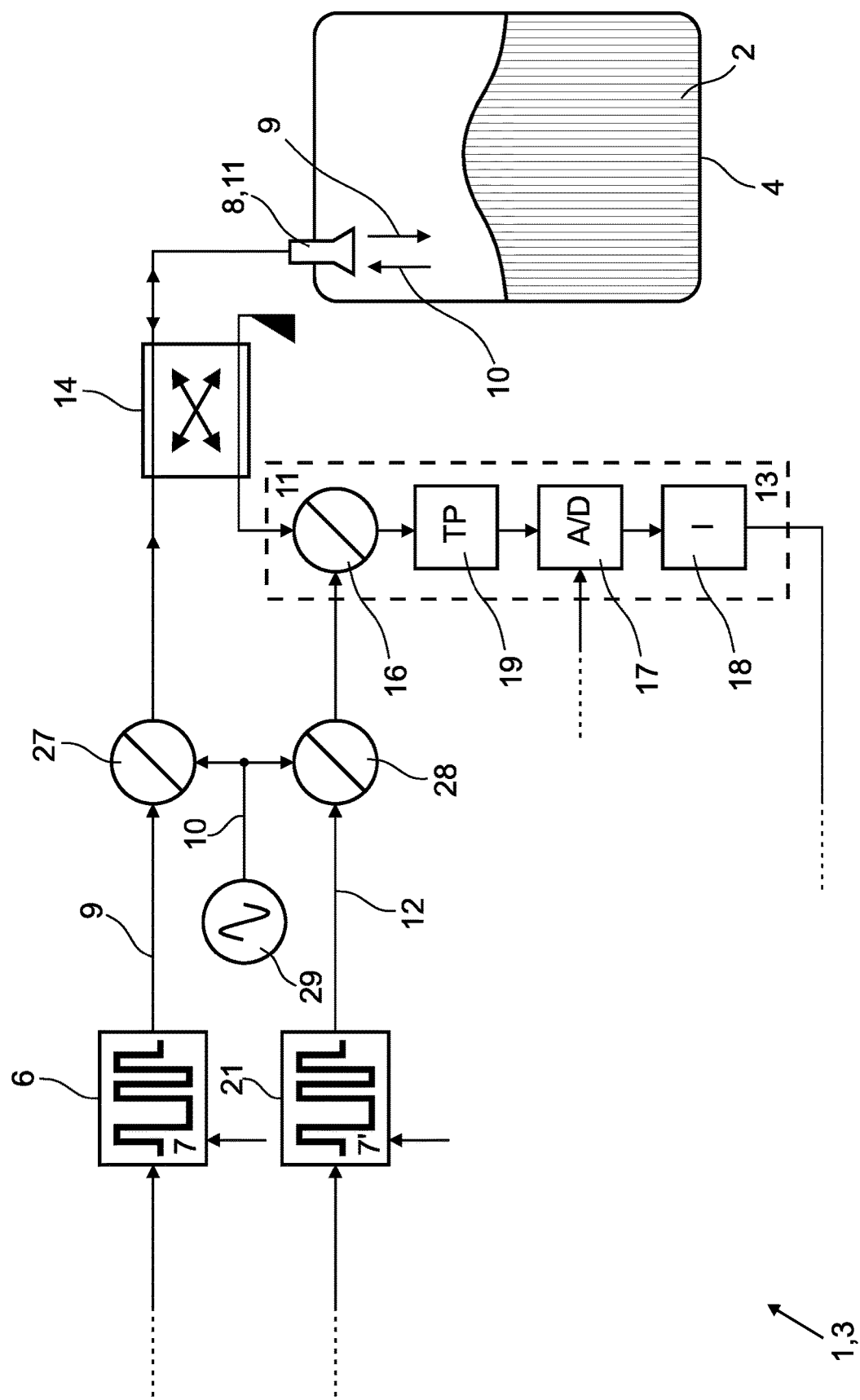
FIG. 6 is like FIG. 5 but with modulation into a high-frequency carrier signal.

It also applies to the embodiment in FIG. 6 that a freely radiating radar is used, wherein the code sequence generator 6 mixes the generated code sequence 7 or the coded transmit signal 9 being coded with the code sequence 7 and the derived signal 12 being derived from the transmit signal 9 with a high mixer 27, 28 by mixing with a high frequency carrier signal 29 into a higher frequency band. It is important that the high mixing takes place with both signals to be correlated, which are multiplied in the mixer 16.

Figure 7:
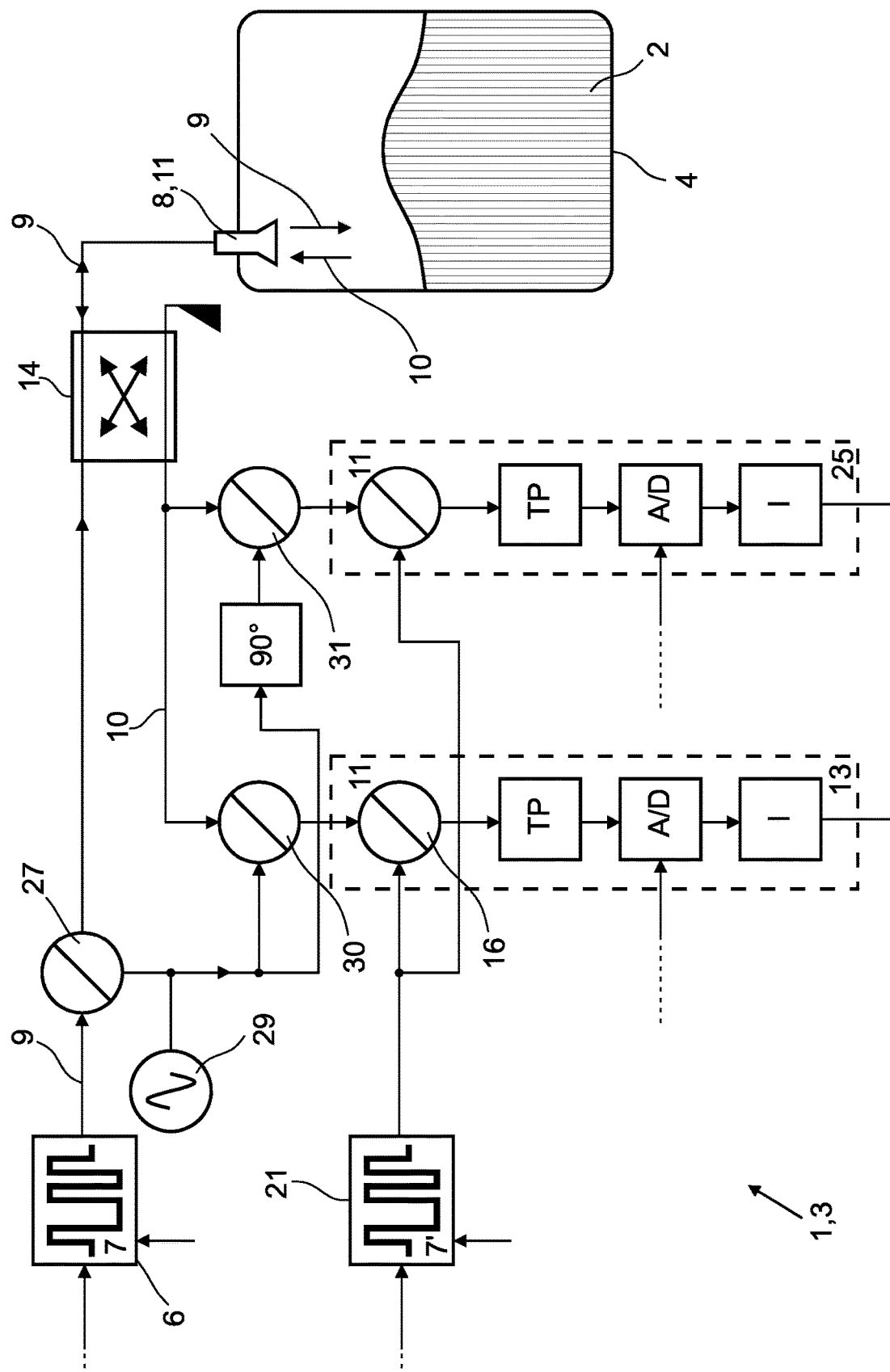
FIG. 7 illustrates a further fill level measuring device with quadrature amplitude demodulation.

FIG. 7 shows a fill level measuring device 3 and a related method 1 for fill level determination, which are characterized in that the code sequence 7 generated by the code sequence generator 6 or, respectively, the coded transmit signal 9 being coded with the code sequence 7 is mixed with a high mixer 27 in a higher frequency band by mixing with a high-frequency carrier signal 29, that the received reflection signal 10 is fed to two separate quadrature mixers 30, 31, that the reflection signal 10 is mixed back into the baseband with one of the two quadrature mixers 30 by mixing with the high-frequency carrier signal and is available as an in-phase component at the output of the quadrature mixer 30, that the reflection signal 10 is mixed back into the baseband with the other quadrature mixer 31 of the two quadrature mixers 30, 31 by mixing with the 90° time-shifted high-frequency carrier signal 29 and is available as a quadrature component at the output of the other quadrature mixer 31, wherein the in-phase component is fed to the analog mixer 16 of the correlator 13 and the quadrature component is fed to the analog mixer of a further correlator 25, wherein the transmit signal 9 or a derived signal 12 being derived from the transmit signal 9 is fed identically to the mixers of the correlators 13, 25 as a further mixed signal in each case.

The quadrature amplitude demodulation implemented in this manner leads to an in-phase component and a quadrature component of the baseband signal, which are processed in parallel in two separate signal processing paths (13, 25). This results in a parallelism of signal processing paths similar to that of the correlator bank in FIG. 4, however the control and pulse compression of the in-phase component or the quadrature component is carried out here with the same further code sequence generator (21).

Figure 8:
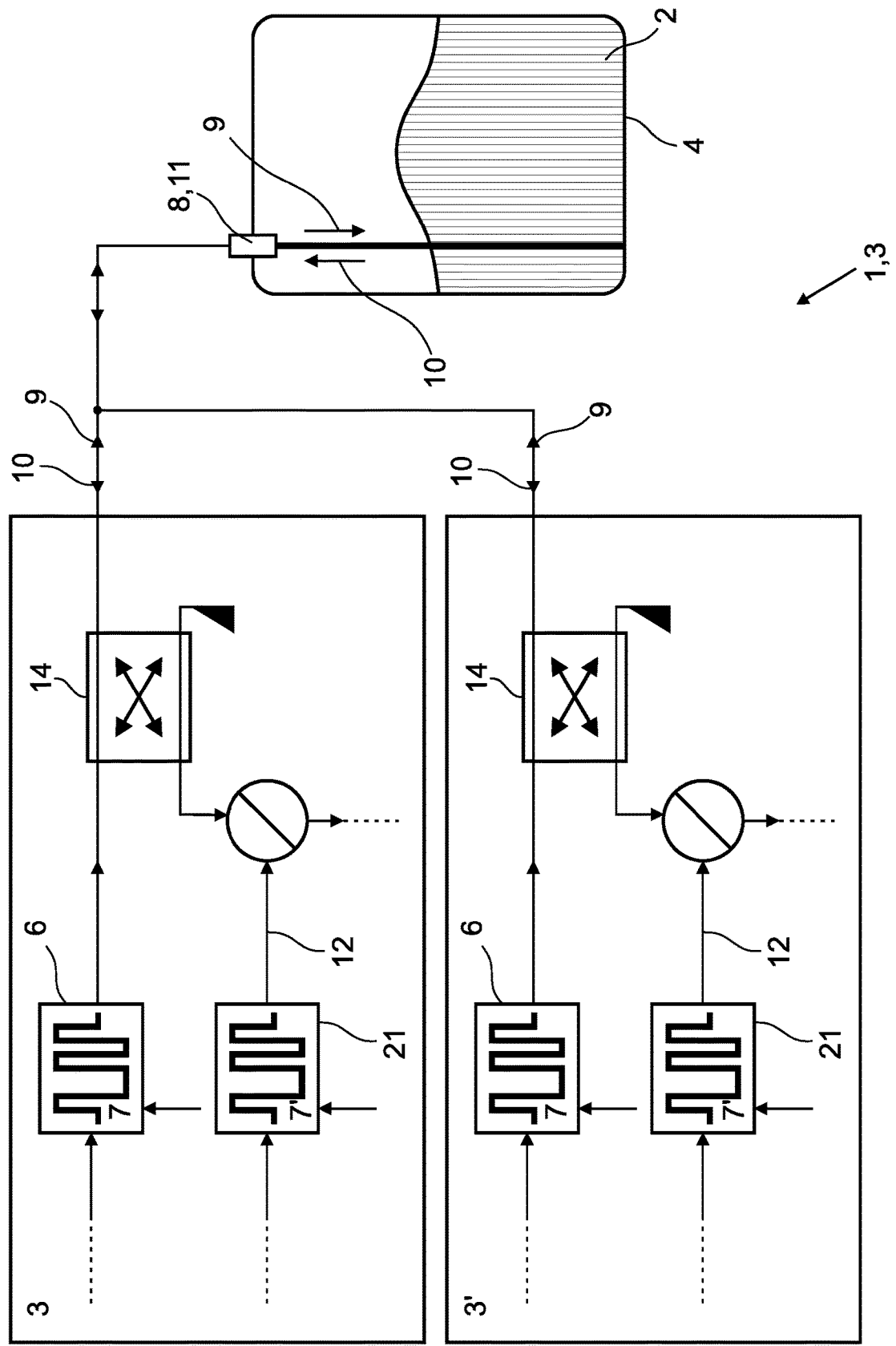
FIG. 8 illustrates a fill level measuring device and a method implemented therein in a redundant design.

FIG. 8 shows a redundantly structured system with several parallel fill level measuring devices, since it makes sense for safety-critical applications, e.g. in accordance with the SIL standard (SIL: Safety Integrity Level). Two (or possibly several) fill level measurement systems 3, 3' are used redundantly, each of which independently measures the fill level of medium 2 within the tanks/silos 4. Preferably, the two fill level measuring devices 3, 3' are connected to the same TDR measuring probe with a common coupling (transmitter 8). Mutual interference between the two fill level measuring devices 3, 3' and thus incorrect measurements can be prevented or greatly reduced advantageously and easily by using coded binary signals (code sequences).

For this, the code sequence generators 6 in the two different fill level measuring devices are designed such that they generate different code sequences such that the cross correlation function of the two generated signals is as close to zero as possible, i.e. that the two binary signals are as strongly orthogonal to each other as possible. Under these conditions, it is ensured that the transmit signal 9 of the first fill level measuring device 3 and the transmit signal 9 of the second fill level measuring device 3' do not lead to faulty detections of TDR targets within the second fill level measuring device 3' and vice versa (code division multiplex).

Figure 9:
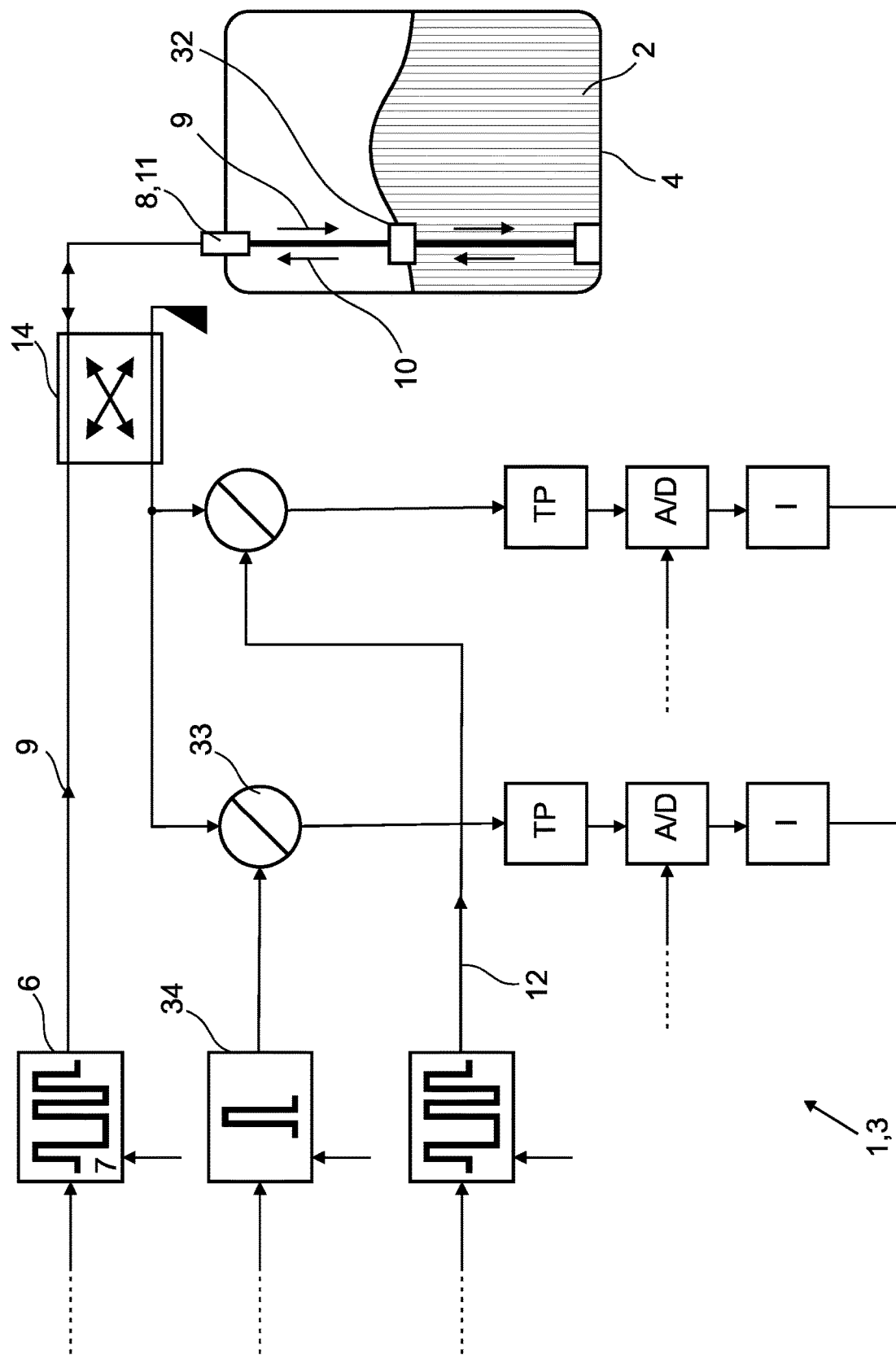
FIG. 9 illustrates a fill level measuring device and a method implemented therein using a coded reflector.

Lastly, in FIG. 9, a method 1 and a fill level measuring device 3 are represented with the property that a coded reflector 32 is used on the medium 2, for example in the form of a float, wherein the coding of the reflector 32 is selected such that the reflection signal 10 of the coded transmit signal 9 is pulse-shaped, wherein the pulse-shaped reflection signal 10 is fed to a pulse mixer 33 and is mixed by the pulse mixer 33 with a pulse generated by a pulse generator 34 and is sampled sequentially, namely by low-pass filtering by means of an analog low-pass filter, subsequent sampling and quantization by an analog/digital converter and integration with a digital integrator. Thus two different measurement methods can be implemented (pulse measurement and measurement of a spread signal), which in turn provides the possibility of self-monitoring by comparing the measurements over both parallel signal paths.

The invention claimed is:

1. A method for determining the fill level of a medium by continuous wave radar measurement, the method comprising:
   generating a code sequence by a code sequence generator;
   emitting a coded transmit signal coded with the code sequence by a transmitter;
   receiving the coded transmit signal at least partially reflected at the medium by a receiver as a reflection signal;
   subjecting the reflection signal and a derived signal being derived from the coded transmit signal to a correlation analysis with a correlator and obtaining a correlation outcome that results;
   determining a time offset of the correlated signals with the correlation outcome and using the time offset to determine the fill level of the medium;
   mixing the reflection signal and the derived signal into a mixer output signal using an analog mixer of the correlator;
   sampling and quantizing the mixer output signal to a digital mixer output signal using an analog/digital converter of the correlator;
   digitally integrating a sequence of digital mixer output signals into the correlation outcome using a digital integrator of the correlator;
   filtering the mixer output signal by an analog low-pass filter of the correlator;
   sampling and quantizing the low-pass filtered mixer output signal by the analog/digital converter to a digital mixer output signal;
   generating a binary code sequence of the length $N_{code}$ by the code sequence generator;
   using the transmitter to emit each bit of the binary code sequence with the bit duration $T_{chip}$ and thereby emit the binary code sequence with the binary code sequence duration $T_{code}=N_{code}*T_{chip}$; and
   sampling the low-pass filtered mixer output signal at a sampling frequency $f_{sample}$ of the analog/digital converter between the bit frequency $1/T_{chip}$ and the code sequence frequency $f_{code}=1/T_{code}$.

2. The method according to claim 1, wherein the sampling frequency $f_{sample}$ of the analog/digital converter corresponds to a multiple greater than ten times the code sequence frequency $f_{code}$.

3. The method according to claim 1, further comprising generating the derived signal using a delay element or using a further code sequence generator, wherein the further code sequence generator generates the same code sequence of the code sequence generator with a time delay to the code sequence of the code sequence generator.

4. The method according to claim 3, further comprising implementing the time delay sequentially in the interval from the bit duration $T_{chip}$ to the binary code sequence duration $T_{code}=N_{code}*T_{chip}$, and in each case increasing by the bit duration $T_{chip}$ in increments.

5. The method according to claim 1, further comprising controlling the generation of the code sequence by the code sequence generator, the generation of the derived signal, the sampling of the mixer output signal or the sampling of the low-pass filtered mixer output signal and also the integration of the digital integrator in an at least indirectly synchronized manner; and
   at least partially indirectly using an intermediate clock and synchronization controller for controlling, wherein the clock and synchronization controller has a digital clock beat.

6. The method according to claim 1, subjecting the reflection signal and a further derived signal being derived from the coded transmit signal to a correlation analysis with at least one further correlator, wherein the further derived signal is time-shifted with respect to the coded transmit signal and/or with respect to the derived signal, so that at least two parallel correlation receivers are implemented.

7. The method according to claim 1, further comprising mixing each of the code sequence generated by the code sequence generator or the coded transmit signal and the derived signal with a high mixer into a higher frequency band by mixing with a high-frequency carrier signal.

8. The method according to claim 1, further comprising mixing the code sequence generated by the code sequence generator or the coded transmit signal with a high mixer into a higher frequency band by mixing with a high-frequency carrier signal;
   feeding the received reflection signal to two separate quadrature mixers;
   mixing the reflection signal back into the baseband with one of the two quadrature mixers by mixing with the high-frequency carrier signal, wherein the reflection signal is available as an in-phase component at the output of the quadrature mixer;
   mixing the reflection signal back into the baseband with the other quadrature mixer of the two quadrature mixers by mixing with the high-frequency carrier signal which is time-shifted by 90°, wherein the reflection signal is available as quadrature component at the output of the other quadrature mixer;
   feeding the in-phase component to the analog mixer of the correlator and feeding the quadrature component to the analog mixer of a further correlator; and
   feeding the coded transmit signal or the derived signal identically to the mixers of the correlators as a further mixed signal in each case.

9. A method for determining the fill level of a medium by continuous wave radar measurement, the method comprising:
   generating a code sequence by a code sequence generator;

emitting a coded transmit signal coded with the code sequence by a transmitter;
receiving the coded transmit signal at least partially reflected at the medium by a receiver as a reflection signal;
subjecting the reflection signal and a derived signal being derived from the coded transmit signal to a correlation analysis with a correlator and obtaining a correlation outcome that results;
determining a time offset of the correlated signals with the correlation outcome and using the time offset to determine the fill level of the medium;
mixing the reflection signal and the derived signal into a mixer output signal using an analog mixer of the correlator; sampling and quantizing the mixer output signal to a digital mixer output signal using an analog/digital converter of the correlator;
digitally integrating a sequence of digital mixer output signals into the correlation outcome using a digital integrator of the correlator;
using a coded reflector on the medium wherein the coded reflector is in the form of a float;
selecting the coding of the reflector such that the reflection signal of the coded transmit signal is pulse-shaped;
feeding the pulse-shaped reflection signal to a pulse mixer for mixing with a pulse generated by a pulse generator;
sequentially sampling the pulse-shaped reflection signal using an analog low-pass filter; and
subsequently sampling and quantizing the pulse-shaped reflection signal using an analog/digital converter and integrating with a digital integrator.

10. A fill level measuring device for determining the fill level of a medium by continuous wave radar measurement, comprising:
a code sequence generator, wherein a code sequence is generated by the code sequence generator;
a transmitter, wherein a coded transmit signal being coded with the code sequence is emitted by the transmitter;
a receiver, wherein the receiver receives the coded transmit signal reflected at least partially at the medium as a reflection signal;
a correlator, wherein the reflection signal and a derived signal being derived from the coded transmit signal are subjected to a correlation analysis with the correlator and a correlation outcome results; and
a control and evaluation unit, wherein the control and evaluation unit determines the time offset of the correlated signals with the correlation outcome and uses it to determine the fill level of the medium;
wherein the correlator includes an analog mixer and the reflection signal and the derived signal are mixed by the analog mixer to form a mixer output signal;
wherein the correlator has an analog/digital converter, with which the mixer output signal is sampled and quantized to a digital mixer output signal;
wherein the correlator has a digital integrator with which a sequence of digital mixer output signals is digitally integrated into the correlation outcome;
wherein the correlator has an analog low-pass filter and the mixer output signal is filtered by the low-pass filter and the low-pass filtered mixer output signal is sampled by the analog/digital converter and quantized to a digital mixer output signal;
wherein a binary code sequence of length $N_{code}$ is generated by the code sequence generator and the transmitter emits each bit of the binary code sequence with the bit duration $T_{chip}$ and the transmitter thereby emits the binary code sequence with the binary code sequence duration $T_{code}=N_{code}*T_{chip}$; and
wherein the sampling of the low-pass filtered mixer output signal takes place at a sampling frequency $f_{sample}$ of the analog/digital converter between the bit frequency $f_{chip}=1/T_{chip}$ and the code sequence frequency $f_{code}=1/T_{code}$.

11. The fill level measuring device according to claim 10, wherein the sampling frequency $f_{sample}$ of the analog/digital converter corresponds to a multiple greater than ten times the code sequence frequency $f_{code}$.

12. The fill level measuring device according to claim 10, wherein a delay element is comprised, wherein the coded transmission signal is fed into the delay element on the input side and the delay element outputs the time-delayed coded transmit signal as the derived signal, and/or wherein a further code sequence generator is comprised, wherein the further code sequence generator generates the same code sequence of the code sequence generator with a time delay to the code sequence of the code sequence generator and outputs it as the derived signal derived from the transmit signal.

* * * * *